United States Patent
Park et al.

(10) Patent No.: US 10,283,109 B2
(45) Date of Patent: May 7, 2019

(54) NICKNAME MANAGEMENT METHOD AND APPARATUS

(71) Applicant: Samsung Electronics Co., Ltd., Suwon-si (KR)

(72) Inventors: Hyoung Min Park, Seoul (KR); Kyoung Gu Woo, Seoul (KR); Hye Jin Kam, Seongnam-si (KR); Jung Hoe Kim, Seongnam-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 217 days.

(21) Appl. No.: 15/236,530

(22) Filed: Aug. 15, 2016

(65) Prior Publication Data

US 2017/0070478 A1     Mar. 9, 2017

(30) Foreign Application Priority Data

Sep. 9, 2015   (KR) .................. 10-2015-0127915

(51) Int. Cl.

| | | |
|---|---|---|
| *G10L 15/02* | (2006.01) | |
| *H04L 29/08* | (2006.01) | |
| *H04W 12/06* | (2009.01) | |
| *H04L 29/06* | (2006.01) | |
| *H04W 4/70* | (2018.01) | |
| *H04W 4/00* | (2018.01) | |
| *G10L 15/00* | (2013.01) | |

(52) U.S. Cl.
CPC .............. *G10L 15/02* (2013.01); *H04L 67/04* (2013.01); *H04L 67/12* (2013.01); *H04L 67/28* (2013.01); *H04W 12/06* (2013.01); *G10L 15/00* (2013.01); *H04L 63/0853* (2013.01); *H04W 4/005* (2013.01); *H04W 4/70* (2018.02)

(58) Field of Classification Search
CPC ......... G10L 15/00; G10L 15/02; H04L 63/08; H04L 63/0853; H04L 63/0876
See application file for complete search history.

(56) References Cited

U.S. PATENT DOCUMENTS

| | | | |
|---|---|---|---|
| 6,584,439 B1 | 6/2003 | Geilhufe et al. | |
| 6,654,720 B1 * | 11/2003 | Graham ................. | G06F 3/16 704/270 |
| 8,032,383 B1 * | 10/2011 | Bhardwaj ............... | G10L 15/30 455/420 |
| 8,731,937 B1 | 5/2014 | Reding et al. | |
| 2002/0069063 A1 * | 6/2002 | Buchner ............. | H04L 12/2803 704/270 |

(Continued)

FOREIGN PATENT DOCUMENTS

| | | |
|---|---|---|
| JP | 2005-56170 A | 3/2005 |
| JP | 2007-226388 A | 9/2007 |

(Continued)

*Primary Examiner* — Eric W Shepperd
(74) *Attorney, Agent, or Firm* — Cha & Reiter, LLC.

(57) ABSTRACT

A nickname management apparatus includes a speech agent configured to recognize a speech of a user to obtain nickname information of a device, and a nickname manager configured to determine a device corresponding to the nickname information from one or more devices on a network, and register the named device based on the determination.

19 Claims, 13 Drawing Sheets

(56) References Cited

U.S. PATENT DOCUMENTS

| | | | |
|---|---|---|---|
| 2003/0064756 A1* | 4/2003 | Nielsen | H04M 1/274583 455/566 |
| 2004/0205335 A1* | 10/2004 | Park | H04L 12/2801 713/155 |
| 2005/0022210 A1* | 1/2005 | Zintel | H04L 12/2803 719/318 |
| 2007/0005370 A1 | 1/2007 | Elshout | |
| 2009/0271203 A1* | 10/2009 | Resch | G10L 15/26 704/275 |
| 2010/0151825 A1 | 6/2010 | Millet Sancho | |
| 2013/0073293 A1* | 3/2013 | Jang | G10L 15/22 704/275 |
| 2014/0274203 A1* | 9/2014 | Ganong, III | H04W 52/0251 455/556.1 |
| 2015/0019974 A1 | 1/2015 | Doi et al. | |
| 2015/0154976 A1* | 6/2015 | Mutagi | H04L 12/281 704/275 |
| 2015/0317668 A1* | 11/2015 | Tietzen | G06Q 30/0239 705/14.39 |
| 2016/0035350 A1* | 2/2016 | Jung | G06F 3/167 704/275 |
| 2016/0043962 A1* | 2/2016 | Kim | H04L 67/02 709/224 |
| 2016/0174266 A1* | 6/2016 | Goel | H04W 4/70 455/509 |
| 2016/0330327 A1* | 11/2016 | Lee | H04L 12/12 |
| 2016/0381497 A1* | 12/2016 | Wan | H04W 4/02 455/456.2 |
| 2017/0116986 A1* | 4/2017 | Weng | G10L 15/22 |

FOREIGN PATENT DOCUMENTS

| | | |
|---|---|---|
| KR | 10-2008-0096239 A | 10/2008 |
| KR | 10-0877614 B1 | 12/2008 |
| KR | 10-2010-0026353 A | 3/2010 |
| KR | 10-0998897 | 12/2010 |

* cited by examiner

FIG. 5A (SPEECH AGENT) DO YOU WANT TO ASSIGN NAME TO NEW LAMP?
(USER) YES
(SPEECH AGENT) WHAT NAME DO YOU WANT TO ASSIGN?
(USER) NAME IT MASTER BEDROOM LAMP
(SPEECH AGENT) THERE IS LAMP HAVING NAME MASTER
BEDROOM LAMP. DO YOU WANT TO SET THE SAME NAME TO IT?
(USER) NO, THEN, NAME NEW LAMP MASTER BEDROOM STAND

FIG. 5B (SPEECH AGENT) DO YOU WANT TO ASSIGN NAME TO NEW LAMP?
(USER) YES
(SPEECH AGENT) WHAT NAME DO YOU WANT TO ASSIGN?
(USER) NAME IT MASTER BEDROOM LAMP
(SPEECH AGENT) OKAY. NAME OF NEW LAMP IS REGISTERED AS MASTER
BEDROOM STAND. THERE IS GROUP MASTER BEDROOM LAMP.
DO YOU WANT TO INCLUDE MASTER BEDROOM STAND IN THIS GROUP?
(USER) YES

FIG. 5C

SPEECH AGENT: VOICE AGENT: DO YOU WANT TO
ASSIGN NAME TO BLINKING NEW LAMP NOW?
USER: NAME IT LIVING ROOM LAMP

FIG. 6A

| NICKNAME INFORMATION | UNIQUE IDENTIFIER | DEVICE PROPERTY | DEVICE OPERATION | INSTALLATION STATE | GROUP INFORMATION |
|---|---|---|---|---|---|
| MASTER ROOM CEILING LAMP | KD2315A | LAMP | LAMP BLINKING | MASTER ROOM CEILING | MASTER ROOM LAMP |
| MASTER ROOM STAND | KD2316A | LAMP | LAMP BLINKING | MASTER ROOM | MASTER ROOM LAMP |
| LIVING ROOM BLINDS | D0682 | BLINDS | LOWERING/RAISING | LIVING ROOM | LIVING ROOM |
| LIVING ROOM TV | 6N55HU9000 | SMART TV | POWER ON/OFF, SOUND, CHANNEL CHANGING, AND CHANNEL SEARCHING | LIVING ROOM | LIVING ROOM |

...

NICKNAME MANAGEMENT METHOD AND APPARATUS

CROSS-REFERENCE TO RELATED APPLICATION(S)

This application claims the benefit under 35 USC 119(a) of Korean Patent Application No. 10-2015-0127915, filed on Sep. 9, 2015, in the Korean Intellectual Property Office, the entire disclosure of which is incorporated herein by reference for all purposes.

BACKGROUND

1. Field

The following description relates to a nickname management method and apparatus.

2. Description of Related Art

With development of information technology (IT), a method of remotely controlling devices has been developed. Devices connected to the Internet, such as a smart phone, a PC, a refrigerator, a washing machine, a watch, and others are referred to as Internet of things (IOT).

Techniques in which devices on a network are controlled by recognizing a speech are being developed in an IOT control system. However, unlike a control using a button connected to a device in a one-to-one correspondence, a keyboard, or a remote controller, when a voice control is applied in an environment such as a smart home and a smart building that has two or more smart devices, a number of problems may occur. Specifically, when there are multiple devices having the same type, a distinction between the devices is required in order to individually operate the devices.

Generally, the distinction between the devices is performed by a serial number, but the user may have difficulty individually remembering an identification mark such as an address or a serial number of a specific device and making a voice command using the identification mark.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a technique for a control system using speech recognition.

In one general aspect, a nickname management apparatus includes a speech agent configured to recognize a speech of a user to obtain nickname information of a device, and a nickname manager configured to determine a device corresponding to the nickname information from one or more devices on a network, and register the named device based on the determination.

The nickname management apparatus may further include a device authenticator configured to authenticate a detected device when a device is detected on the network.

The speech agent may be configured to ask the user to register nickname information of the authenticated device in a voice form in response to an authenticating of the detected device by the device authenticator.

The nickname management apparatus may be a smart phone, a smart TV, laptop, or tablet and the device may be an Internet of Things (IoT) device.

The nickname manager may be configured to determine a device corresponding to the nickname information based on one or any combination of two or more of a property of the device, an installation state of the device, and a user's request.

The nickname management apparatus may further include a device controller configured to operate the determined device. The speech agent may obtain nickname information on an operating device from the user. The device controller may be configured to manipulate, toggle, or control one or more of power, a displaying state, vibration, sound, and an input and output state of the device to operate the device.

The nickname manager may be configured to register device information, a unique identification number, and the nickname information in a database. The device information, unique identification number, and the nickname information may be received from a user.

In response to one or more of an installation state and connection state being changed, the speech agent may be configured to ask the user whether to register a nickname change and receive a response from the user to obtain nickname information. The nickname manager may be configured to register the obtained nickname information.

The nickname manager may be configured to group the nickname information based on one or any combination of two or more of the nickname information, a property of the device, an installation state of the device, and a user's request, and further configured to register group information in a database.

The nickname manager may include a synchronizer configured to communicate with another control device on the network and synchronize nickname information stored in a database.

In another general aspect, a nickname management method includes recognizing a speech of a user to obtain nickname information of a device, determining a device corresponding to the nickname information from one or more devices on a network, and registering the named device based on the determination.

The method may further include, in response to a device being detected on the network, authenticating the detected device. The obtaining of the nickname information may include asking the user whether to register nickname information of the authenticated device in a speech or text format.

The determining of the device may include determining a device corresponding to the nickname information based on one or more of a property of the device, an installation state of the device, and a user's request.

The method may further include operating the determined device, wherein the obtaining of the nickname information comprises obtaining nickname information on the operating device from the user. The operating of the device may include manipulating, toggling, or controlling one or more of power, a displaying state, vibration, sound, and an input and output state of the device.

The registering of the named device may include registering device information, a unique identification number, and the nickname information in a database. The nickname information may be received from the user.

The obtaining of the nickname information may include asking the user whether to register a nickname change, in response to one or more of an installation state and connection state of the device being changed and receiving a response from the user to obtain nickname information. The registering of the nickname information may include registering the nickname information.

The method may further include grouping the nickname information based on at least one of the nickname information, a property of the device, an installation state of the device, and a user's request.

The method may further include communicating with another control device on the network and synchronizing nickname information stored in a database.

Other features and aspects will be apparent from the following detailed description, the drawings, and the claims.

BRIEF DESCRIPTION OF THE DRAWINGS

FIGS. 5A to 5C are examples in which a speech agent converses with a user according to an embodiment.

FIG. 6A is an example in which nickname information is registered in a database according to an embodiment.

Figure 1:
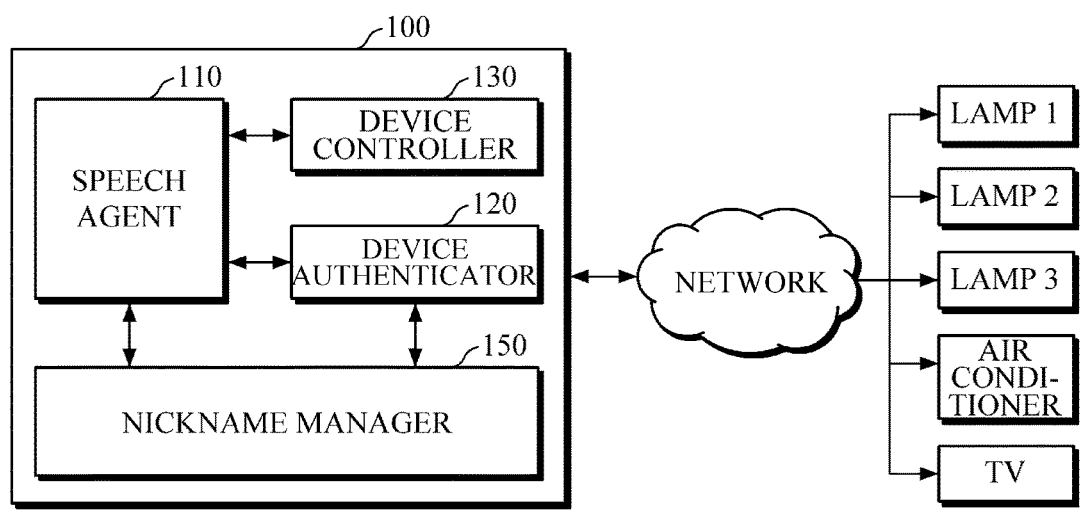
FIG. 1 is a block diagram illustrating a nickname management apparatus according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, embodiments of a nickname management apparatus and a method thereof will be described in detail with reference to the drawings. According to an embodiment, the nickname management apparatus 100 may be mounted on a mobile terminal, a gateway, or a control server, that may communicate with each device, such as a smart home or a smart building on a home network, or the nickname management apparatus may be implemented in devices, such as a smart phone, a smart TV, a smart watch, or smart glasses which support a smart home function, noting that additional and/or alternative applications, and embodiments are equally available.

FIG. 1 is a block diagram illustrating the nickname management apparatus 100 according to an embodiment. Referring to FIG. 1, the nickname management apparatus 100 includes a speech (voice) agent 110, a nickname manager 150, a device authenticator 120, and a device controller 130, as an example only, though embodiments are not limited thereto.

As an automated intelligent dialog or conversational device, the speech agent 110 obtains nickname information of a device by recognizing a user's speech. The speech agent 110 may obtain the nickname information by recognizing the speech and analyzing a recognized result using a speech recognition algorithm. Herein, speech agents (or just "agents") are particularly implemented through computing technologies, and thus may refer to computer or processing device hardware, that perform recognition and/or understanding operations of audio information, such as in an intelligent dialog interaction between a user and the agent. The speech agent 110 may be a separate processing or other hardware element that is specifically configured to emulate or simulate a natural voice of an utterance processing apparatus, or terminal or device including the same that performs the recognizing of the primary speech and/or that responds to the user. Alternatively, the speech agent 110 may be incorporated with one or more processors of the nickname management apparatus 100, terminal, or device, configured to generate either a speech signal or generate and amplify the speech signal for output by a speaker of the nickname management apparatus, terminal, or device, as only examples. For example, the speech agent 110 may be included in one or more processors of the nickname manager 150, the device authenticator 120, and/or the device controller 130, which may alternatively be variously combined through one or more processors. As an automated intelligent dialog device, the speech agent 110 may implement one or more speech recognition approaches or algorithms, to recognize captured or provided speech. For example, in one or more embodiments the speech agent 110 is representative of audio frame digitizer/generator to parse/convert input analog speech into digital audio frames that are provided to an included speech recognizer having one or more of an acoustic model and language model, as only examples, stored in a memory, along with corresponding acoustic and/or language dictionaries or databases, of the nickname management apparatus 100. Using respective probability, for example, results of the acoustic model and/or the language model, the speech recognizer of the speech agent 110 may recognize input speech and a content analyzer (or semantic analyzer) of the speech agent 110 may use such acoustic or language dictionaries or databases to understand the content of an input speech query, command, or input, and generate appropriate responses of the understood speech to be provided back to the user or may implement further operations or scheduled operations of the nickname management apparatus 100 based on the understood speech, for example. The example speech recognizer and/or content/semantic analyzer may be implemented through a same or different respective one or more processors of the nickname management apparatus 100. In an another embodiment, either of the example speech recognizer and/or content/semantic analyzer may be implemented by another device, such as another like terminal or server device in a wired or wireless local or personal area network or a remote terminal, server, or cloud based service not a member of such a local or personal area network, which may be provided captured analog or digital audio data and which may return to the nickname management apparatus 100 results of any of the speech recognition, content/sematic understanding, or determined appropriate replies or action instructions based on the same. The acoustic or language models may respectively include one or more Hidden Markov Models, Gaussian Mixture Model, and/or Neural Networks, such as a Deep Neural Network (DNN), a Recurrent Neural Network (RNN), a Bidirectional Recurrent Deep Neural Network (BRDNN), noting that embodiments are not limited to the same. Such models may be trained using appropriate training data.

Accordingly, the speech agent 110 may be an intelligent agent that may determine a user's request and a user's intention by analyzing a content of, or meaning of a recognized word from, the user's speech. The speech agent 110 may further be a conversational agent that may converse with a user.

According to an embodiment, the speech agent 110 may ask the user whether to register a nickname when registration of the nickname for the device is desired, for example, when a new controllable device is installed and/or authenticated in a home network. Meanwhile, when an installation state or connection state of a device of which a nickname is already registered is changed, the speech agent 110 may notify the user of corresponding content and ask the user whether to register or re-register the nickname change. Further, the speech agent 110 may confirm the user's request or notify the user of a processing result, and may ask the user whether to register the nickname information. For example, when a new lamp is installed in the network and the installed lamp is authenticated in a control system, the speech agent 110 may ask the user "Do you want to assign a name to the new lamp?"

Here, the nickname information may be an identification mark which describes a name, an alias, a nickname, or a position and state of an object. Generally, the user may have difficulty referring to a device by an Internet protocol (IP) address or a serial number of the device since remembering IP addresses or serial numbers for all devices on the home network may be difficult. Accordingly, the user may use a nickname, which is an easy-to-say name or an individual user's subjective name for each device on a home network, as the identification mark.

The speech agent 110 may obtain the nickname information by recognizing the user's speech and analyzing the recognized result, and ask the user whether to register a nickname for a corresponding device. When the speech agent 110 receives a response from the user, the speech agent 110 transfers the obtained nickname information to the nickname manager 150.

The nickname manager 150 may determine a device corresponding to the nickname information from one or more devices on the network, and register the named device based on the determination. For example, the nickname manager 150 may register device information, a unique identification number, and the nickname information, which is obtained from the user, in a database.

According to an embodiment, the nickname management apparatus 100 further includes the device authenticator 120. Here, when a new device is detected in the home network using a technique such as a near field communication (NFC) technique, for example only, the device authenticator 120 may authenticate the detected device in the home network.

For example, when the new device is installed in the network, the device authenticator 120 may authenticate the device. In this case, the speech agent 110 may ask the user whether to register the nickname for the authenticated device. When the speech agent 110 receives a response from the user and obtains nickname information, the nickname manager 150 may determine the authenticated device as a device corresponding to the nickname information, and register the named device.

In this case, the device authenticator 120 may authenticate the device after the installation of the device or may install the device after the authentication of the device and the registration of the nickname, and thus the present disclosure is not limited to an installation order of the device.

According to an embodiment, the nickname manager 150 may determine a device corresponding to the nickname information obtained by the speech agent 110 on the basis any one or any combination of two or more of a property of the device, an installation state of the device, and a user's request. For example, the nickname manager 150 may store and manage the property, and installation state of the device connected to the network in the database, and obtain a meaning of the nickname information obtained by analyzing the user's speech and the user's request from the speech agent 110. Accordingly, the nickname manager 150 may determine a device which is named by the user and corresponds to the nickname information on the basis of any one or any combination of two or more of the property of the device, installation state of the device, and the user's request. Also, the nickname manager 150 may register the named device in the database based on the determination.

According to an embodiment, when there are multiple devices corresponding to nickname information, nicknames may be sequentially registered. The nickname management apparatus 100 may further include the device controller 130 which operates a device determined to be a device corresponding to the nickname information. The device controller 130 may operate the device by manipulating any one or any combination of two or more of power, a displaying state, vibration, sound, and an input and output state of the device, as examples only.

For example, the device controller 130 may display the corresponding device to the user by blinking a lamp, or indicator light, of a predetermined device, vibrating the device, or outputting a sound, or any combination thereof. Further, the device controller 130 may operate the device to perform an original function thereof. Here, the device controller 130 may communicate with another control device on the network to operate a device connected to the other control device.

When the device controller 130 operates the predetermined device, the speech agent 110 may ask the user "Do you want to register a nickname for the device that is operating now?", for example, and when receiving a response from the user, the nickname manager 150 may register obtained nickname information in the database. In this case, the device controller 130 may sequentially operate devices for which nicknames are not registered, and update the nickname of each of the device to be registered based on a user's response. That is, the controller 130 sequentially activates each device which a nickname is not registered, and requests a nickname for the corresponding activated device from the user.

According to an embodiment, the nickname manager 150 may group the obtained nickname information based on any one or any combination of two or more of the obtained nickname information, the property of the device, the installation state of the device, and the user's request. The user may subjectively assign a nickname for each device for the sake of convenience. However, when words constituting a nickname are meaningful words or words for describing the property of the device and the installation state of the device, the nickname manager 150 may prioritize and group the obtained nickname information by classifying the obtained nickname information by category.

For example, the nickname manager 150 may obtain a result analyzed according to the meaning of the nickname information and the user's request from the speech agent 110, and group the nickname information based on the property and installation state of the device registered in the database. Group information grouped in the nickname manager 150 may be stored in the database with the nickname information. Further, the speech agent 110 may provide the group information grouped in the nickname manager 150 to the user, and ask the user whether to register corresponding group information in the database.

Meanwhile, the nickname manager 150 may change the registered nickname information in response to a user's request for a nickname change. Further, when one or both of the installation state and connection state of the device are changed, the speech agent 110 may ask the user whether to register the nickname change, receive a response from the user, and obtain nickname information. Then, the nickname manager 150 may register the obtained nickname information in the database.

For example, when the user forgets the registered nickname information and refers to the same device with a different nickname or the installation state or connection state of the device is changed, the speech agent 110 may ask the user whether to register the nickname change, receive a response from the user, and obtain the changed nickname information. When the changed nickname information is transferred from the speech agent 110, the nickname manager 150 may register the changed nickname information in the database.

According to an embodiment, the nickname manager 150 may communicate with another control device on the network to synchronize the nickname information stored in the database. An embodiment thereof will be described below with reference to FIG. 4.

Figure 2:
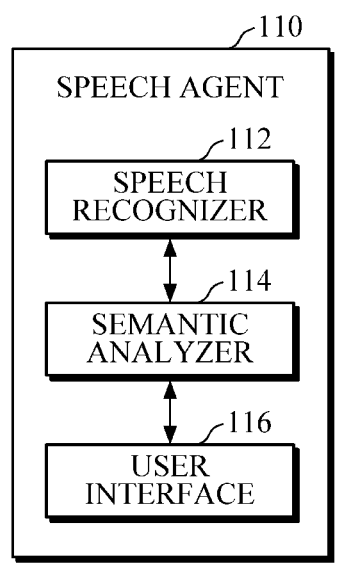
FIG. 2 is a diagram illustrating an example of a block diagram illustrating a speech agent according to an embodiment.

FIG. 2 is a diagram illustrating an example of a detailed block diagram illustrating a speech agent, such as the speech agent 110 of FIG. 1. The speech agent 110 according to one or more embodiments may include a speech recognizer 112, a semantic analyzer 114, and a user interface 116. The speech agent 110 of FIG. 2 may correspond to the speech agent 110 of FIG. 1, however, embodiments are not limited thereto.

The speech recognizer 112 recognizes a voice or speech input from a user. The speech recognizer 112 may recognize the user's speech input through a microphone using a voice or speech recognition algorithm, such as discussed above, noting that embodiments are not limited thereto.

The semantic analyzer 114 may perform an understanding operation as discussed above, to analyze meanings of words or phrases included in the user's speech or information on a property, type, and installation state of a device included in the user's request by analyzing a speech recognition result. For example, when the speech recognizer 112 recognizes a request like "Please turn off the master bedroom lamp" from the user, the speech recognizer 112 may analyze an installation position and property information of the device by inferring that the request is a request to turn off a 'lamp' installed in the 'master bedroom.'

Meanwhile, the user may want to register a meaningless nickname or alias as a nickname for the device. In this case, the semantic analyzer 114 may recognize nickname information obtained by recognizing the user's speech in a proper noun form.

The user interface 116 may receive the speech from the user and output a response thereto in a voice or other audible form. This process may be made in the form of a conversation with the user.

For example, when a new lamp is connected to the network, the user interface 116 may ask the user "Do you want to assign a name to the new lamp?" and "What name do you want to assign?" Also, the user interface 116 may receive a response like "Name it master bedroom lamp" from the user. Further, when the nickname, 'master bedroom lamp,' is registered to the device corresponding to the nickname information in the nickname manager 150, the user interface 116 may output a processing result in response to the user's request.

A microphone, a display, and a speaker, which are embedded in the nickname management apparatus 100 or in a device on which the nickname management apparatus 100 is mounted, may be used as the user interface 116. However, the present invention is not limited thereto, and the user interface 116 may converse with the user using a microphone, a display, and a speaker which are mounted on another device on the network and external to the nickname management apparatus 100. In this case, the user interface 116 may converse with the user in a voice format or in a method of outputting text to the display.

Figure 3:
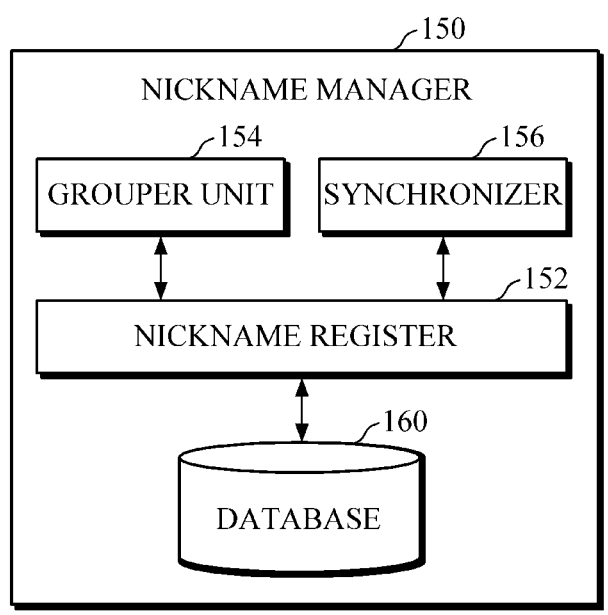
FIG. 3 is a diagram illustrating an example of a block diagram illustrating a nickname manager according to an embodiment.

FIG. 3 is a diagram illustrating an example of a nickname manager 150. The nickname manager 150 of FIG. 3 may correspond to the nickname manager 150 of FIG. 1, but embodiments are not limited thereto. Referring to FIG. 3, the nickname manager 150 may include a nickname register 152, a grouper 154, a synchronizer 156, and a database 160. The database may be stored on or include a memory of the nickname manager 150 or underlying electronic device.

The nickname register 152 may store the nickname information obtained from the speech agent 110 and the device on the home network, which corresponds to the nickname information, in the database 160. In this case, the nickname register 152 may match the property, the installation state, and the unique identification number (e.g., an IP address, a serial number, and an identifier (ID)) of the device to the nickname information and store it in the database 160. When the nickname information is registered in the database 160, the speech agent 110 may use the nickname information as identification information of the device when recognizing the user's voice.

Referring to FIG. 3, the database 160 is mounted in the nickname management apparatus 100, but the database 160 may be external to the nickname management apparatus 100, although embodiments are not limited thereto.

The speech agent 110 may receive a nickname change registration request from the user. When the speech agent 110 obtains changed nickname information from the user, the nickname register 152 may register the changed nickname information in the database 160. Further, when the installation state and connection state of the device are changed, the speech agent 110 may ask the user whether to register the nickname change. For example, when the nickname is 'master bedroom lamp' and a lamp in the master bedroom is moved into a living room, the speech agent 110 may ask the user "Do you want to change the name of the master bedroom lamp?" In response to the inquiry, when the user responds with "Please change it to the living room lamp," as an example only, the nickname registering unit 152 may change the nickname of the 'master bedroom lamp' to the 'living room lamp' and register the changed nickname in the database 160.

According to an embodiment, the nickname register 152 may determine a device corresponding to the nickname information based on one or any combination of two or more of a property of the device, an installation state of the device, and a user's request. For example, when the speech agent 110 recognizes the user's speech as "Please register the blinds in the living room as living room blinds" from the user, the speech agent 110 may analyze the user's speech as a meaning of registering a nickname of 'blinds (a property of the device)' located in the 'living room (an installation position).' The nickname register 152 may determine a device which is located in the living room and is blinds.

However, when a plurality of blinds are installed in the living room due to a large size of a window, whether the 'blinds in the living room' named by the user refers to all of the blinds in the living room or some of them may be unclear. In this case, the speech agent 110 may ask the user "Do you want to register all of the blinds in the living room as the living room blinds?" In response to the inquiry, when receiving a response from the user, the nickname registering unit 152 may register the nickname information according to the user's response. The speech agent 110 may similarly respond to any plurality of devices in a location.

Further, the nickname management apparatus 100 may confirm the device named by the user using the device controller 130. Alternatively, the device controller 130 may perform a process for sequentially registering pieces of nickname information on devices for which nickname information is not registered. For example, when the device controller 130 lowers some of the blinds located in the living room, the speech agent 110 may ask the user "Do you want to register the now lowered blinds as the living room blinds?" When the speech agent 110 receives a response of "yes", or other affirmative response, from the user, the nickname register 152 may register the blinds operated by the device controller 130 as the 'living room blinds' in the database 160.

The speech agent 110 may further ask the user whether to register nicknames for the remaining blinds in the living room. The speech agent 110 may iteratively perform a process of asking the user whether to register nicknames for devices for which pieces of nickname information are not registered. When the nickname information is obtained from the speech agent 110 and the device corresponding to the nickname information is specified, the nickname register 152 may register the nickname information in the database 160.

The grouper 154 may group the obtained nickname information based on the nickname information obtained from the speech agent 110, the user's request, and the property and the installation state of the device registered in the database 160. The user may subjectively assign a nickname for each device for the sake of convenience. However, when words constituting a nickname are meaningful words or words for describing the property of the device and the installation state of the device, the nickname manager 150 may prioritize and group the obtained nickname information by classifying the obtained nickname information by category. An embodiment thereof will be described below with reference to FIG. 6B.

The synchronizer 156 may communicate with another control device on the network to synchronize it with the external database 160. An embodiment thereof will be described below with reference to FIG. 4.

Figure 4:
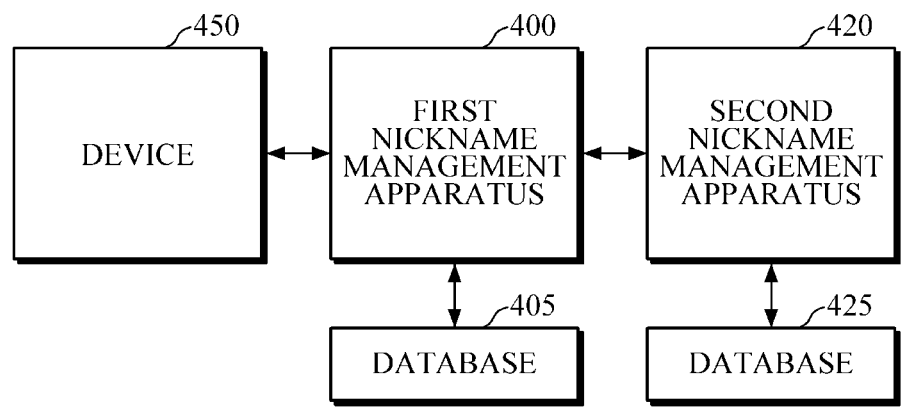
FIG. 4 is a diagram illustrating an example in which a nickname management apparatus communicates with another apparatus on a network according to an embodiment.

FIG. 4 is a diagram illustrating an example in which a plurality of nickname management apparatuses are connected on a network. According to an embodiment, the nickname management apparatuses may communicate with one or more devices using WiFi, ZigBee, NFC, and/or Bluetooth or another nickname management apparatus and a control device. The nickname apparatuses of FIG. 4 may correspond to the nickname management apparatus 100 of FIG. 1. However, embodiments are not limited thereto.

For example, a first nickname management apparatus 400 may communicate with home devices such as a lamp, blinds, a washing machine, and a refrigerator, and with a control device such as a smart phone, a smart TV, a gateway, and a control server, as examples only. In addition to the embodiment of FIG. 4, there are various types of devices and control devices. For example, in a network for managing an office building, the first nickname management apparatus 400 may communicate with devices such as a lamp, a copying machine, and a heater, and with a building management system which is a network control device.

A plurality of devices, control servers, and nickname management apparatuses may be on a home network. Referring to FIG. 4, the first nickname management apparatus 400 may communicate with each of a device 450 and a second nickname management apparatus 420.

The first nickname management apparatus 400 may obtain nickname information through a direct communication with a user, and use a microphone and speaker of another pre-installed device, as an example only. The microphone and speaker may be included in the nickname management apparatus 400, as only an example.

The first nickname management apparatus 400 may register the nickname information in a database 405, and the second nickname management apparatus 420 may register the nickname information in a database 425. In this case, the first nickname management apparatus 400 may synchronize the database 405 with the second nickname management apparatus 420 periodically or when new nickname information is stored. In the same manner, the first nickname management apparatus 400 may also obtain the nickname information registered by the second nickname management apparatus 420 by being synchronized with the database 425 of the second nickname management apparatus 420.

Further, the first nickname management apparatus 400 may use a device which may be controlled by the second nickname management apparatus 420 by communicating with the second nickname management apparatus 420. In addition to the provided embodiment, the first nickname management apparatus 400 may perform a control on a device not connected to the first nickname management apparatus 400 by communicating with a gateway, a control server, a control hub, another smart device which supports the speech agent 110.

According to an embodiment, the first nickname management apparatus 400 may be a smart phone, a smart TV, a smart watch, smart glasses, laptop, or tablet. When there are a plurality of smart devices which may perform a function of the speech agent 110 and a device control function on the home network, a distributed system may collaborate and perform each function in the plurality of devices.

For example, a user's speech may be recognized in a smart phone which may be the first nickname management apparatus 400, nickname information may be stored in a smart TV which may be the second nickname management apparatus 420, and a named device may be controlled by the smart phone which operates as the first nickname management apparatus 400 or the smart TV which operates as the second nickname management apparatus 420. In the same manner, each of the nickname management apparatuses may constitute a distributed control system through communication with another control device.

FIGS. 5A to 5C are examples in which a speech agent according to one or more embodiments of the present invention converses with the user. According to one or more embodiments, the speech agent 110 may be an intelligent agent that may converse with the user, may recognize a speech received from the user through a microphone, and output a response to the user in a voice form, audible form, or in a method of outputting text to a display.

FIG. 5A is an example in which the nickname management apparatus 100 assigns a name to a newly installed lamp. Referring to FIG. 5A, when the speech agent 110 asks the user "Do you want to assign a name to the new lamp?" the user responds with "yes." Also, when the speech agent 110 asks the user "What name do you want to assign?" the user may respond with "Name it master bedroom lamp." In this case, the nickname management apparatus 100 may obtain 'master bedroom lamp' as nickname information through the speech agent 110, and determine a new lamp as a device corresponding to the nickname information. However, when there is a 'master bedroom lamp' having the same nickname in the database, the speech agent 110 may once again ask the user "There is a lamp having the name master bedroom lamp. Do you want to set the same name as it?" In response to the inquiry, when the user responds with "No, name the new lamp the master bedroom stand," the nickname management apparatus 100 may store 'master bedroom stand' as the nickname information in the database, as an example only.

FIG. 5B is an example in which group information is added when registering the nickname information. When the speech agent 110 asks the user "Do you want to assign a name to the new lamp?" and receives a response of "yes" from the user, the speech agent 110 may ask the user "What name do you want to assign?" When the speech agent 110 receives a response of "Name it master bedroom stand" from the user, the nickname management apparatus 100 may store the new lamp as the nickname information in the database, and the speech agent 110 may respond to the user with "Okay. The name of the new lamp is registered as master bedroom stand," as an example only.

In this case, the nickname management apparatus 100 may provide group information of 'master bedroom lamp' belonging to a parent category of the obtained nickname information to the user through the speech agent 110, and ask the user whether to add the group information. Accordingly, the speech agent 110 may ask the user "There is a group named master bedroom lamp. Do you want to include the master bedroom stand in the group?" Here, the group information of 'master bedroom lamp' may be group information automatically grouped by the nickname management apparatus 100 on the basis of a property and installation state of the device. Alternatively, the speech agent 110 may receive a request for registering the group information of 'master bedroom lamp' from the user, and register the group information. When the speech agent 110 receives a response of "yes" from the user, the nickname management apparatus 100 may store 'master bedroom stand' as the nickname information and 'master bedroom lamp' as the group information.

FIG. 5C is an example in which the nickname management apparatus 100 operates a device on the network and confirms the device by presenting it to the user. According to one or more embodiments, when the device controller 130 causes a lamp to blink for a short time, the speech agent 110 may ask the user "Do you want to assign a name to the blinking new lamp now?" When the speech agent 110 receives a response of "Name it living room lamp" from the user, the nickname management apparatus 100 may store 'living room lamp' as the nickname information in the database for the operated lamp.

When the nickname information is registered, the speech agent 110 may identify the corresponding device as the registered nickname information when the user refers to a nickname corresponding to a device later. Further, the speech agent 110 may also infer that words, which are not registered as the nickname information by the user, are the user referring to devices on the basis of data stored in the database.

FIG. 6A is an example of nickname information registered in a database. Referring to FIG. 6A, a nickname management apparatus may register items such as nickname information, a unique identifier, a device property, a device operation, an installation state, and group information in the database. When the device controller 130 authenticates a device on a home network, the nickname manager 150 may register information on a unique identifier, a device property, and a device operation in the database. In this case, an installation state of the device may be registered before the authentication of the device and when the device is installed independently with the nickname information.

Referring to FIG. 6A, the nickname register 152 may install a device, of which a unique identifier is KD2315 and a device property is a lamp, on a master bedroom ceiling using master bedroom ceiling lamp as the nickname information, and register a lamp blinking as the device operation in the database. In this case, the nickname register 152 may group a master bedroom ceiling lamp as a master bedroom lamp on the basis of the property and installation state of the device, and register group information in the database.

In the same manner, unique identifiers, device properties, device operations, installation states, pieces of group information corresponding to nickname information of devices such as a master bedroom stand, living room blinds, and a living room TV may be registered.

FIG. 6A should be interpreted as an embodiment, and various items may be further included in the database in addition to the items provided in FIG. 6A. Thus, embodiments are not limited thereto and may be varied. In the same manner, the database according to the embodiment of FIG. 6A is not made with a required minimum configuration, and items which may be registered in the database should be flexibly interpreted.

Figure 6B:
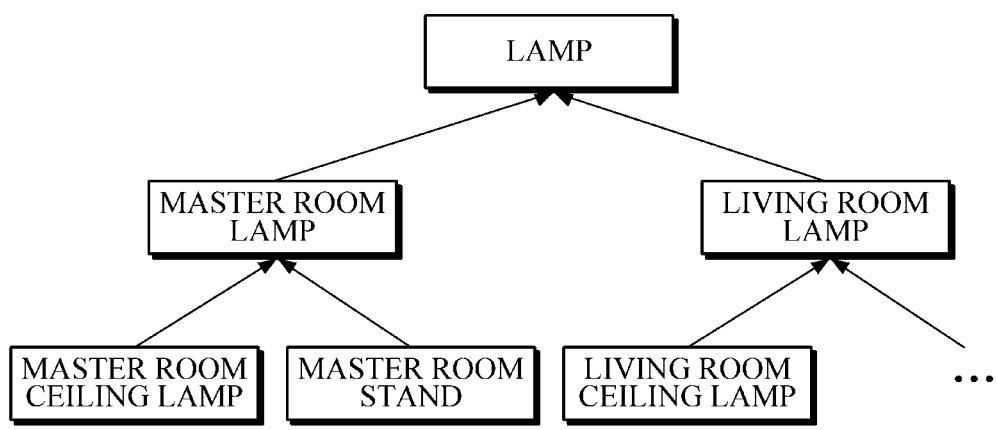
FIG. 6B is an example in which nickname information is grouped according to an embodiment.

FIG. 6B is an example in which nickname information is grouped. The nickname management apparatus 100 may register nickname information, and group the nickname information based on one or any combination of two or more of a property of a device, an installation state of the device, and a user's request.

For example, the nickname management apparatus 100 may classify a top category as the property of the device, a lower category according to the installation state of the device (an installation position), and the registered nickname information as a top/lower category.

Referring to FIG. 6B, lamp is classified as top group information, master bedroom lamp is classified as lower group information, and 'master bedroom ceiling lamp' and 'master bedroom stand' which are nickname information may be classified as a master bedroom lamp as group information.

The group information in the database may be used to obtain the nickname information by the speech agent 110, analyze the nickname information, or control the devices based on the nickname information according to the user's request.

FIGS. 7 to 10 are flowcharts of a method of managing a nickname using the nickname management apparatus according to one or more embodiments. Descriptions identical to those of FIG. 1 will not be repeated for conciseness.

Figure 7:
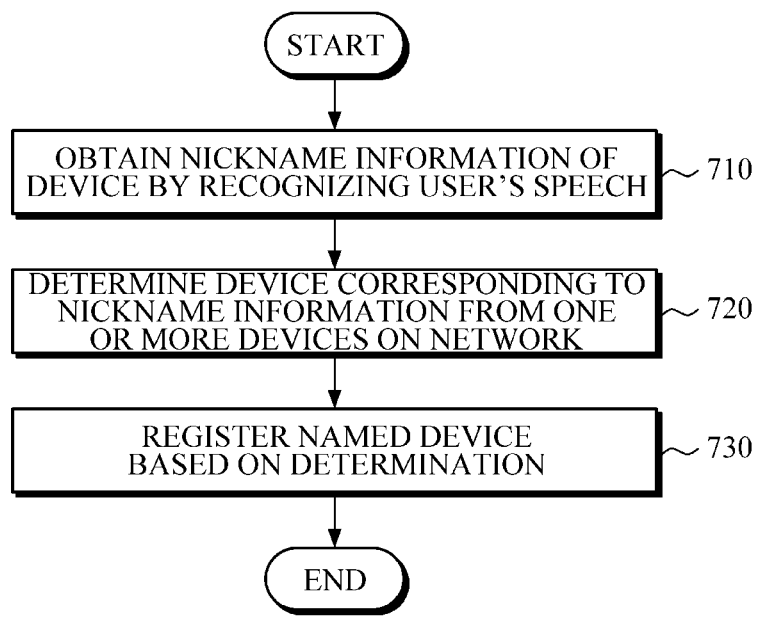
FIG. 7 is a flowchart of a nickname management method using a nickname management apparatus according to an embodiment.

FIG. 7 is a flowchart of a nickname management method using a nickname management apparatus according to one or more embodiments.

First, the speech agent 110 obtains nickname information of a device by recognizing a user's speech in operation 710. The speech agent 110 may obtain the nickname information by recognizing the user's speech and analyzing a recognized result using a speech recognition algorithm.

According to one or more embodiments, the speech agent 110 may ask the user whether to register a nickname when registration of the nickname for the device is desired, for example, when a new controllable device is installed or authenticated on a home network, or both. When an installation state or connection state of the device of which a nickname is already registered is changed, the speech agent 110 may notify the user of corresponding content and ask the user whether to register or re-register a nickname change.

The nickname manager 150 may determine a device corresponding to the nickname information from one or more devices on the network in operation 720.

According to one or more embodiments, the nickname manager 150 may determine a device corresponding to the nickname information obtained by the speech agent 110 on the basis of one or any combination of two or more of a property of the device, an installation state of the device, and a user's request. For example, the nickname manager 150 may store and manage the property, installation state, and other information of the device connected to the network in a database, and obtain a meaning of the nickname information obtained by analyzing the user's speech and the user's request from the speech agent 110. Accordingly, the nickname manager 150 may determine a device, which is named by the user and corresponds to the nickname information, on the basis of one or any combination of two or more of the property and installation state of the device, and the user's request.

The nickname manager 150 may register the named device in the database based on the determination in operation 730. For example, the nickname manager 150 may register device information, a unique identification number, and the nickname information, which is obtained from the user, in the database.

Figure 8:
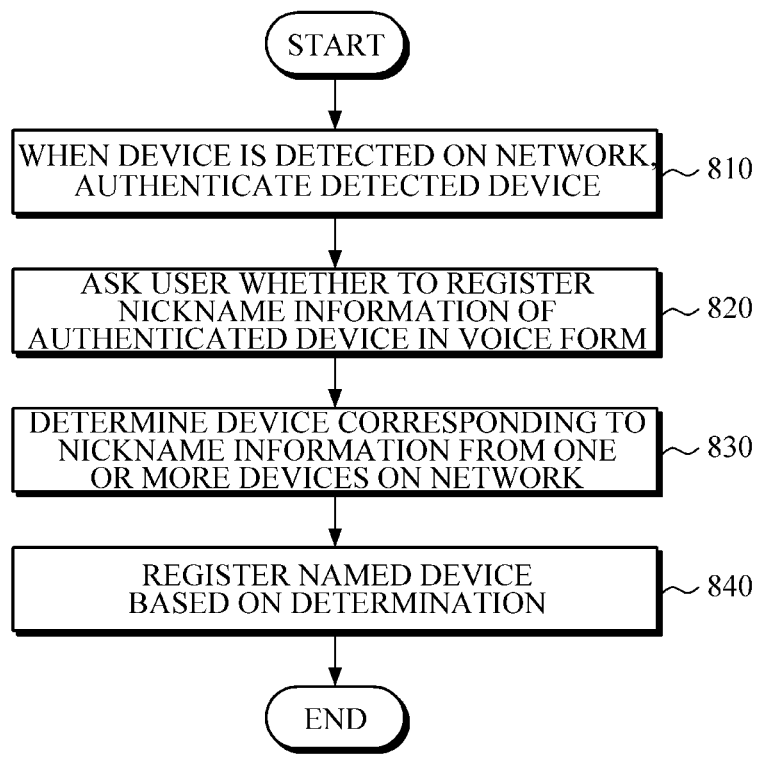
FIG. 8 is a flowchart illustrating an example in which nickname information is registered after a device is authenticated using a nickname management apparatus according to an embodiment.

FIG. 8 is a flowchart illustrating an example in which nickname information is registered after a device is authenticated using a nickname management apparatus according to one or more embodiments of the present invention.

First, when a device is detected on a network, the device authenticator 120 may authenticate the detected device in operation 810. For example, when a new device is detected on a home network using a technique such as an NFC technique, for example, the device authenticator 120 may authenticate the detected device on the home network. For example, when a new device is installed on the network, the device authenticator 120 may authenticate the device. In this case, the device authenticator 120 may authenticate the device after the installation of the device or may install the device after the authentication of the device and the registration of a nickname, and thus embodiments are not limited to an installation order of the device.

The speech agent 110 may ask the user whether to register nickname information of the authenticated device in a voice form, or format, in operation 820. When the speech agent 110 receives a response from the user and obtains the nickname information, the speech agent 110 may transfer the obtained nickname information to the nickname manager 150. For example, when a new lamp is installed on the network and the installed lamp is authenticated in a control system, the speech agent 110 may ask the user "Do you want to assign a name to the new lamp?" Further, the speech agent 110 may check a user's request or notify the user of a processing result, and may ask the user whether to register the nickname information.

In operation 830, the nickname manager 150 determines a device corresponding to the nickname information from one or more devices on the network. Here, the nickname manager 150 may determine the authenticated device as a device corresponding to the nickname information.

In operation 840, the nickname manager 150 registers the named device based on the determination.

Figure 9:
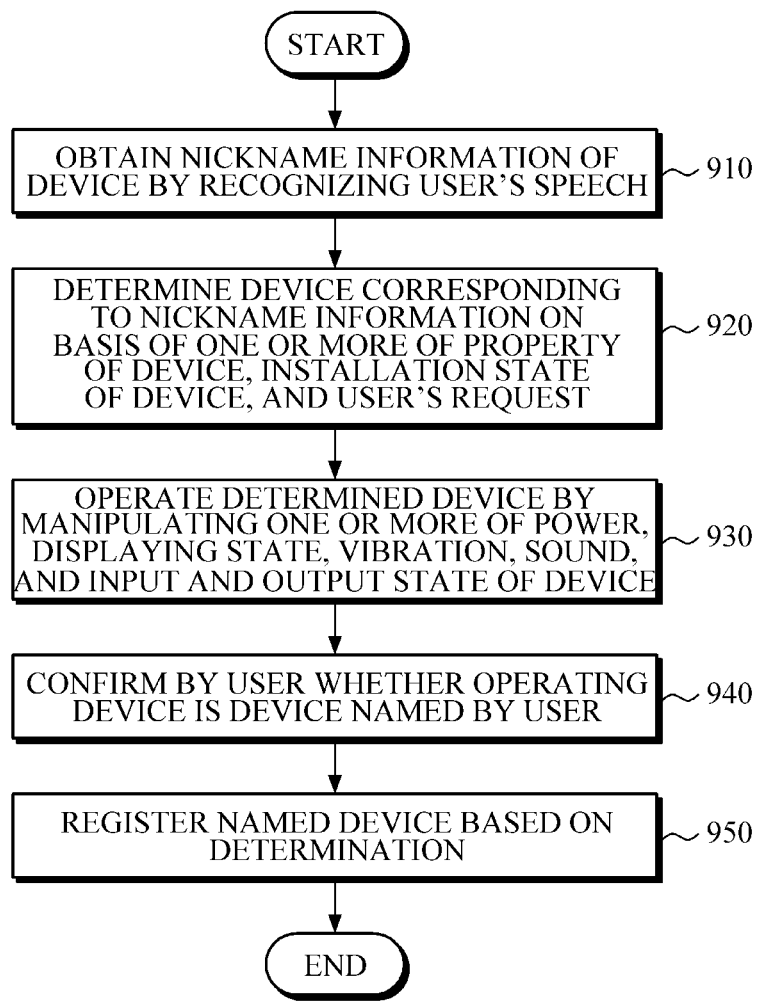
FIG. 9 is a flowchart illustrating an example in which a device corresponding to nickname information is determined using a nickname management apparatus according to an embodiment.

FIG. 9 is a flowchart illustrating an example in which a device corresponding to nickname information is determined using a nickname management apparatus according to one or more embodiments.

In operation 910, the speech agent 110 obtains nickname information of a device by recognizing a user's speech. The speech agent 110 may obtain the nickname information by recognizing the user's speech and analyzing a recognized result, and ask the user whether to register a nickname for a corresponding device.

In operation 920, the nickname manager 150 determines a device corresponding to the nickname information on the basis of one or more of a property of the device, an installation state of the device, and a user's request. For example, the nickname manager 150 may store and manage the property, the installation state, and other information of the device connected to a network in a database, and obtain a meaning of the nickname information obtained by analyzing the user's speech and the user's request from the speech agent 110. Accordingly, the nickname manager 150 may determine a device which is named by the user and corresponds to the nickname information on the basis of one or more of the property and installation state of the device and the user's request.

In operation 930, the device controller 130 may operate the determined device by manipulating, toggling, or controlling one or any combination of two or more of power, a displaying state, vibration, sound, and an input and output state of the device.

For example, the device controller 130 may display the corresponding device to the user by blinking a lamp of a predetermined device, vibrating the device, or outputting a sound. Further, the device controller 130 may operate the device to realize an original function thereof. Further, the device controller 130 may communicate with another control device on the network to operate a device connected to the other control device.

In operation 940, the speech agent 110 may confirm nickname information on the operating device from the user.

In operation 950, the nickname manager 150 may register the named device based on the determination.

According to the embodiment of FIG. 9, the device named by the user in a voice form is specified and a determination result is confirmed by the user. Thus, errors in a speech recognition result may be reduced and a user's intention may be confirmed. When there are a plurality of devices of which nicknames are desired to be registered, it may be desirable to confirm the user's intention for each of the devices. Further, the embodiment of FIG. 9 may be perform a process for sequentially registering pieces of nickname information on devices for which pieces of nickname information are not registered.

Figure 10:
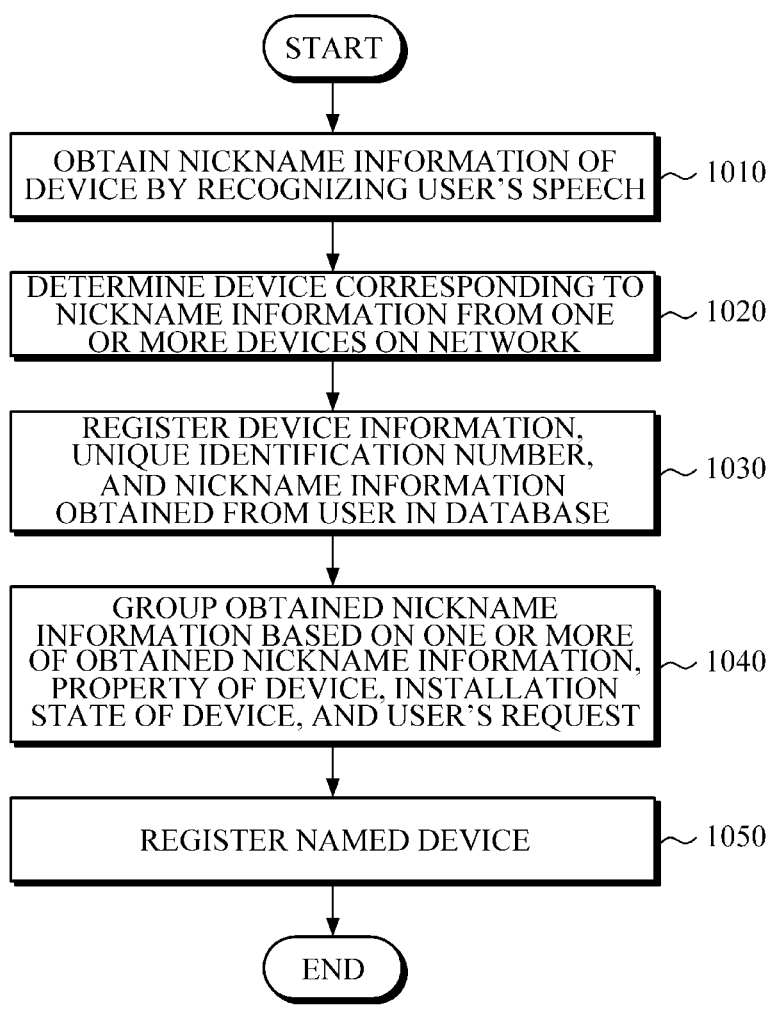
FIG. 10 is a flowchart illustrating an example in which nickname information is grouped using a nickname management apparatus according to an embodiment.

FIG. 10 is a flowchart illustrating an example in which nickname information is grouped using a nickname management apparatus according to one or more embodiments of the present invention.

In operation 1010, the speech agent 110 obtains nickname information of a device by recognizing a user's speech.

In operation 1020, the nickname manager 150 determines a device corresponding to the nickname information from one or more devices on a network.

In operation 1030, the nickname manager 150 registers device information, a unique identification number, and the nickname information, which is obtained from the user, in a database.

In operation 1040, the nickname manager 150 groups the obtained nickname information based on one or any combination of two or more of the obtained nickname information, a property of the device, an installation state of the device, and a user's request. The user may subjectively assign a nickname for each device for convenience. However, when words constituting a nickname are meaningful words or words for describing the property of the device and the installation state of the device, the nickname manager 150 may prioritize and group the obtained nickname information by classifying the obtained nickname information by category.

For example, the nickname manager 150 may obtain a result analyzed according to the meaning of the nickname information and the user's request from the speech agent 110, and group the nickname information based on the property and installation state of the device registered in the database.

In operation 1050, the nickname manager 150 registers the named device. Group information grouped in the nickname manager 150 may be stored in the database with the nickname information. Further, the speech agent 110 may provide the group information grouped in the nickname manager 150 to the user, and ask the user whether to register corresponding group information in the database.

The nickname manager 150 may change the registered nickname information in response to a user's request for a nickname change. Further, when one or more of the installation state and connection state of the device are changed, the speech agent 110 may ask the user whether to register the nickname change, receive a response from the user, and obtain nickname information. Then, the nickname manager 150 may register the obtained nickname information in the database.

The inquiry and response examples provided above are only examples and are not meant to limit the disclosure. The user interface, speech agent, and user may inquire and respond using any speech, audible, electrical, or visual response to express the desired inquiry or command. Thus, embodiments are not limited thereto.

The respective speech agents 110, device controller 130, device authenticator 120, nickname manager 150, speech recognizer 112, semantic analyzer 114, user interface 116, grouper 154, synchronizer 156, and nickname register 152 in FIGS. 1-4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5A-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

What is claimed is:

1. An electronic device comprising:
    a memory; and
    a controller, coupled to the memory, configured to:
        recognize a first speech of a user and identify nickname information of a first device based on the first speech;
        control the first device corresponding to the nickname information to perform at least one predefined action which is observable by the user;
        in response to controlling the first device, receive a user input for registering the nickname information;
        in response to the receiving the user input, register the nickname information to be associated with the first device; and
        in response to identifying the nickname information and a command from a second speech of the user, control the first device to perform the identified command.

2. The electronic device of claim 1, wherein the controller is further configured to authenticate the first device when the first device is identified by the electronic device.

3. The electronic device of claim 2, wherein the controller is further configured to ask the user to register the nickname information of the authenticated first device in a voice form in response to authenticating of the first device.

4. The electronic device of claim 1, wherein the electronic device includes a smart phone, a smart TV, laptop, or tablet and the device is an Internet of Things (IoT) device.

5. The electronic device of claim 1, wherein the controller is further configured to identify the first device corresponding to the nickname information based on at least one of a property of the first device, an installation state of the first device, and a request of the user related to the first device.

6. The electronic device of claim 1, wherein the controller is further configured to manipulate, toggle, or control at least one of power, a displaying state, vibration, sound, and an input and output state of the first device to operate.

7. The electronic device of claim 1, wherein the controller is further configured to register device information, a unique identification number, and the nickname information in a database,
    wherein the device information, unique identification number, and the nickname information are received from the user.

8. The electronic device of claim 1, wherein the controller Is configured to:
    in response to at least one of an installation state and connection state of the first device being changed, ask the user whether to register a nickname change, receive a response from the user to obtain the nickname information, and
    register the obtained nickname information.

9. The electronic device of claim 1, wherein the controller is configured to group the nickname information based on at least one of the nickname information of the first device, a property of the first device, an installation state of the first device, and a user's request related to the first device, and register group information in a database.

10. The electronic device of claim 1, wherein the electronic device further comprises a synchronizer configured to communicate with another control device on a network and synchronize the nickname information stored in a database.

11. A nickname management method comprising:
   recognizing a first speech of a user and identifying nickname information of a first device based on the first speech;
   controlling the first device corresponding to the identified nickname information to perform at least one pre-defined action which is observable by the user;
   in response to controlling the first device, receiving a user input for registering the identified nickname information;
   in response to receiving the user input, registering the identified nickname information to be associated with the first device; and
   in response to identifying the nickname information and a command from a second speech of the user, controlling the first device to perform the identified command.

12. The method of claim 11, further comprising, detecting the first device in a network; and
   in response to the first device being detected on the network, authenticating the first device.

13. The method of claim 12, wherein the identifying of the nickname information comprises asking the user whether to register the nickname information of the authenticated first device in a speech or text format.

14. The method of claim 11, further comprising determining the first device corresponding to the nickname information based on at least one of a property of the first device, an installation state of the first device, and a user's request related to the first device.

15. The method of claim 11, wherein the controlling the first device comprises manipulating, toggling, or controlling at least one of power, a displaying state, vibration, sound, and an input and output state of the first device.

16. The method of claim 11, wherein the registering of the first device comprises registering device information, a unique identification number, and the nickname information in a database,
   wherein the nickname information is received from the user.

17. The method of claim 11, wherein the identifying the nickname information comprises:
   asking the user whether to register a nickname change, in response to at least one of an installation state and connection state of the first device being changed, and
   receiving a response from the user to obtain the nickname information,
   wherein the registering of the nickname information comprises registering the nickname information.

18. The method of claim 11, further comprising grouping the nickname information based on at least one of the nickname information of the first device, a property of the first device, an installation state of the first device, and a request of the user related to the first device.

19. The method of claim 11, further comprising communicating with another control device through a network and synchronizing the nickname information stored in a database.

* * * * *